May 10, 1966 R. J. BECHT 3,250,290
SERVO OPERATED VALVES
Filed April 10, 1963 3 Sheets-Sheet 2
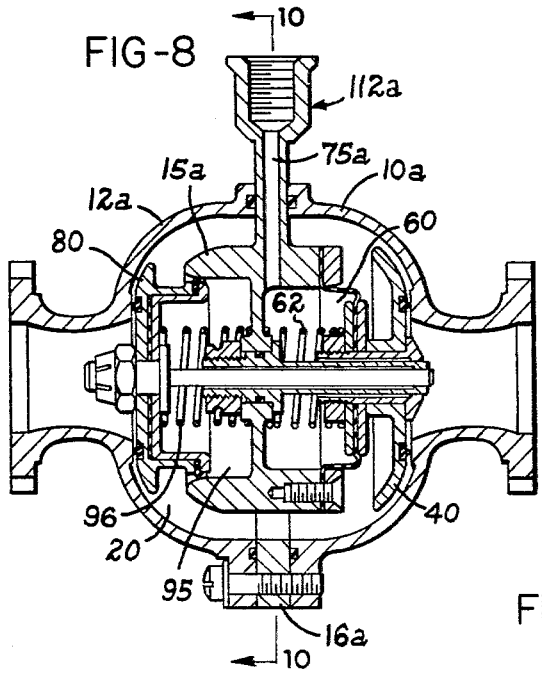
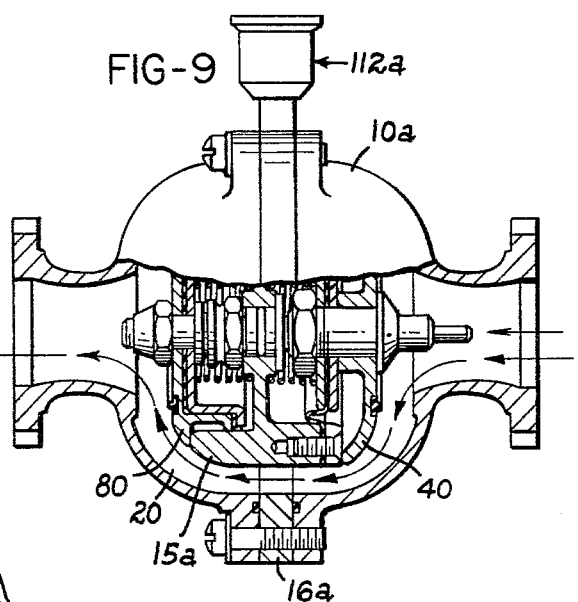
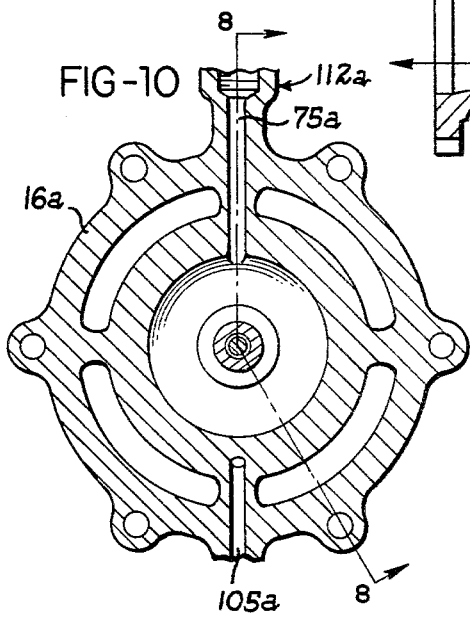
INVENTOR.
RICHARD J. BECHT
BY
Marechal, Biebel, French & Bugg
ATTORNEYS

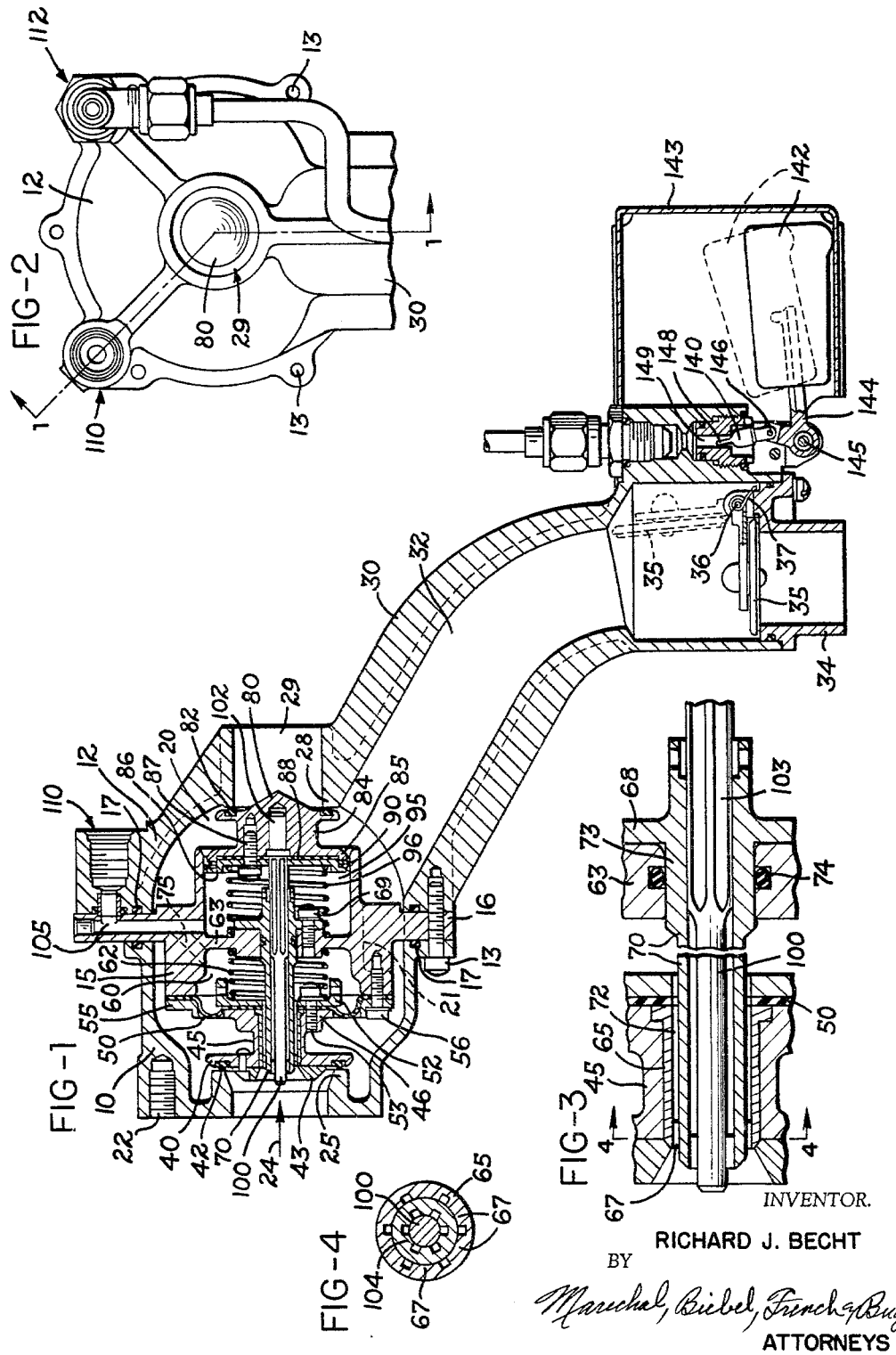

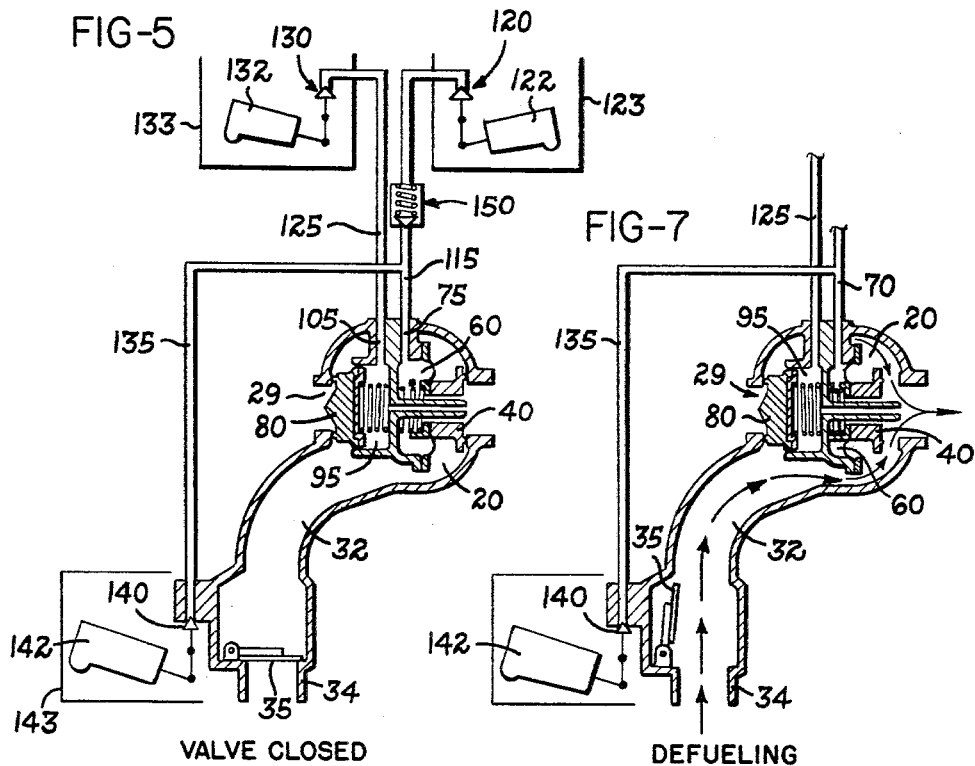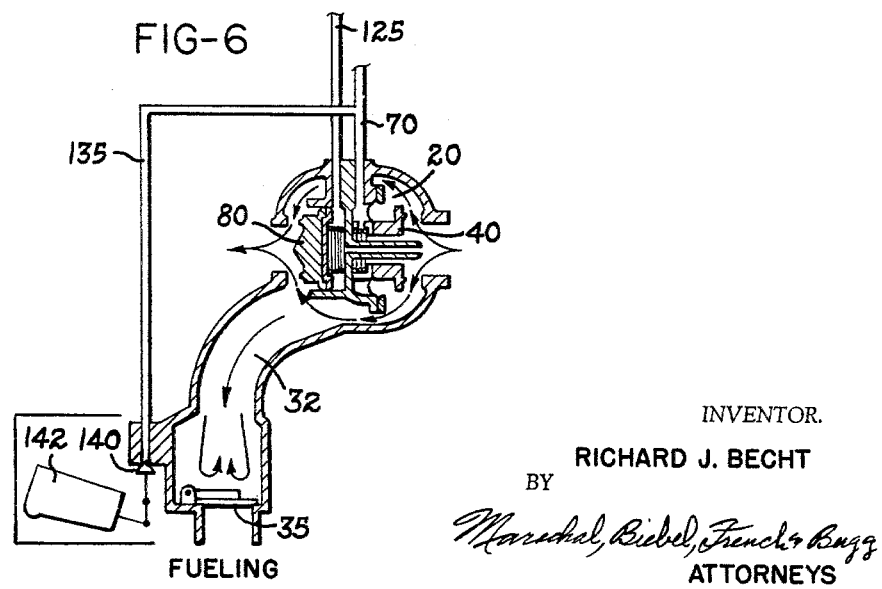

United States Patent Office 3,250,290
Patented May 10, 1966

3,250,290
SERVO OPERATED VALVES
Richard J. Becht, Dayton, Ohio, assignor to Koehler-Dayton, Inc., a corporation of Ohio
Filed Apr. 10, 1963, Ser. No. 272,037
3 Claims. (Cl. 137—414)

This invention relates to servo operated valves, particularly as used for liquid level control and for the control of fuel flow into and out of fuel tanks.

The valves in accordance with this invention have utility in a number of different fluid handling devices. This will be apparent from the description of their construction and mode of operation. However, the primary utility of the present invention is in connection with the handling of liquid fuel flow into and out of the fuel tanks of aircraft, and the invention is therefore described with such background in mind. Various configurations of safety valve constructions have been proposed for regulating the flow of liquid fuel, usually under relatively high pressure and at a substantial volume flow, into tanks. There is a particular problem in this regard in connection with the fuel tanks of aircraft. These tanks are necessarily of as lightweight construction as is possible, and if permitted to overfill, the relatively high pressure and large volume flow into the tank during a fueling operation may be sufficient to rupture the tank and thereby put the aircraft out of service while extensive repairs are made.

Basically, there have been two approaches to the need for reliability of operation of such valves. Both involve the use of separate float operated pilot valves within the tank whereby each pilot valve is open and closed independently of the other and thereby controls the flow through a servo bypass duct. In one configuration a pair of separate valves are arranged to control serially and independently the flow of fuel through a valve housing into the tank. These valves are of essentially identical construction, and usually have been provided as valve members mounted on flexible diaphragms, and each independently movable to close against its corresponding valve seat when pressure is caused to build up in a chamber behind its diaphragm. Valves of this type are shown, for example, Patent No. 2,619,108. The other dual reliability arrangement involves the use of a single valve member, cooperating with a single seat, but in which there are two independently movable diaphragms, each associated with a pressure chamber, and either of which can operate to close the valve member when pressure builds up in its associated chamber.

The present invention relates to an improved form of dual reliability valves of the first mentioned type, wherein the servo motors connected to control the two valve members are of peculiarly different constructions, such that the chances of both of such servo motors being disabled are substantially lessened. The present invention also incorporates a novel diaphragm valve construction wherein the valve can be used to control withdrawal of fuel from the tank from a pipe separate from the normal fill connection.

Accordingly, the primary object of this invention is to provide a novel dual reliability valve in which the valve housing contains separate valve seats, through both of which fluid must flow in passing through the valve housing, together with independently operable valve members cooperating with the respective seats and independent servo motors controlling such valve members, and wherein such servo motors are of substantially different configuration and construction to minimize the possibility of both servo motors being disabled at the same time.

Another object of the invention is to provide such a dual reliability valve wherein one such servo motor is provided by a flexible diaphragm enclosing a pressure chamber and mounting one of the valve members, whereby the advantages of quick response of such a servo motor are obtained, and wherein the other servomotor is of the piston-cylinder type, with the piston carrying the valve member, and wherein a seal is provided between such piston and cylinder to obtain the advantages of continued operation of such servo motor under partial leaking conditions.

A further object of the invention is to provide such a dual reliability valve construction wherein a defueling pipe is attached as an integral part of the valve housing, and extends from a chamber between the valve members, whereby during a defueling operation, fuel may be withdrawn through the pipe and thence through only one of the valve members while the other valve member remains closed.

A further object of the invention is to provide a novel servo valve arrangement for the defueling configuration of the valve construction.

Other objects and advantages of the invention will be apparent from the following description, the accompanying drawings and the appended claims.

In the drawings:

FIG. 1 is a vertical section view taken through a valve construction according to the invention, including the defueling arrangement;

FIG. 2 is a partial end view of the valve shown in FIG. 1, indicating the section along which FIG. 1 is taken by the section line 1—1, and showing the separate control duct connections;

FIG. 3 is a detail view on a substantially enlarged scale, showing the arrangement of the servo fluid inlets to the respective pressure control chamber of the valve construction;

FIG. 4 is a sectional view taken on lines 4—4 of FIG. 3;

FIGS. 5, 6 and 7 are schematic drawings of the valve construction shown in FIG. 1, illustrating respectively the valves in closed position as when the tank is full, in open position, during a tank filling fuel operation, and the position of the parts during a defueling operation;

FIG. 8 is essentially a vertical section taken through another form of the valve construction, in which the defueling arrangement is omitted;

FIG. 9 is a view similar to FIG. 8, but with a portion of the housing shown in elevation, and illustrating the valve members as such; and FIG. 10 is a sectional view taken on line 10—10 of FIG. 8.

Referring to the drawings, which show preferred embodiments of the invention, and particularly with reference to FIG. 1, the valve body is shown as formed of an inlet casing 10 and an outlet casing 12, fastened together by suitable bolts 13. These bodies clamp between them an operator housing 15 having an outwardly extending flange 16 which is sealed to the respective casings by O-rings or the like 17. Internally of the combined casings there is formed in the assembled valve body a valve chamber 20, within which the housing 15 is seated. It will be understood that there is a substantial opening through this housing, for example as indicated by the dot-dash line 21, whereby the parts of this chamber formed in the respective casings are in free and open communication with each other.

The entire body is adapted, for example, to be mounted within a tank, slightly above the bottom thereof, and for this purpose, one or more threaded sockets 22 are provided in the casing 10. When filling the tank a suitable supply hose or the like is connected to direct a flow of fluid under pressure into the valve body as indicated by the directional arrow 24. This flow thus passes first through the valve seat 25 formed within the casing 10. The fluid then flows around the operator housing and past a further valve seat 28 formed in the casing 12, and thence out the outlet opening 29 into the tank.

In the particular configuration shown in FIG. 1 there is a depending defueling pipe 30, preferably formed as a part of the casing 12, and having a passage 32 formed therein which communicates directly with the main valve chamber 20. At its bottom the pipe 30 is provided with an outlet fitting 34, normally closed by a flapper type check valve 35 which is pivotally mounted on a pin 36, and urged to the closed position in which it is shown by a spring 37.

The flow through the inlet valve seat 25 is controlled by a first valve member 40, provided with a flexible ring-like seal 42 which can form a tight seal with the seat 25. A somewhat tapered guiding head 43 is also carried on the valve member 40. This member includes a rearwardly extending neck 45 (see also FIG. 3) terminating in a mounting body 46, and this body is attached to the central part of a flexible diaphragm 50. This attachment can be made through a backup plate 52 and one or more suitable bolts 53. The outer edges of the diaphragm are fastened in sealed relation to the operator housing by a ring 55 and a plurality of bolts one of which is shown at 56. Thus, the diaphragm forms with the housing 15 a variable volume control chamber 60. A spring 62 is mounted within this chamber and acts between the central web 63 of the housing 15 and the backup plate 52, tending to urge the valve 40 into its seated position as shown, but with a relatively slight pressure which can readily be overcome by the pressure of inflowing fuel against the face of the valve 40, absent sufficient closing pressure in the control chamber 60.

The valve member 40 and its mounting body 46 are hollow, providing a passage through the center in which a sleeve 65 (FIG. 3) is fastened, during assembly of the parts to the diaphragm. This sleeve has a number of inwardly extending fingers 67, also shown in FIG. 4, which engage a stationary guide sleeve 70 mounted in fixed relation to the web 63 by means of an integral flange 68 and one or more bolts 69 (FIG. 1). The internal diameter of the sleeve 65 is somewhat greater than the external diameter of the guide sleeve 70, thereby providing a passage 72, including the openings between adjacent fingers 67, through which fluid under pressure from the inlet can pass into the chamber 60. This fluid is prevented from passing the web 63 by reason of the tight fit of the shank 73 of the guide sleeve 70 with that web, and a suitable ring seal 74 is also provided between these parts to prevent leakage therethrough. Fluid can pass from the chamber 60 through a bypass control duct 75 (FIG. 1) which is connected, as will be described, to a pilot valve which may be mounted within the tank.

Cooperating with the other valve seat 28 there is a valve member 80 preferably having a ring-type compressible seal 82 carried on its face to form a tight seal with the valve seat. The valve member is formed as part of a movable body 84 having an enlarged end 85 forming a piston, together with a cooperating plate 86. This plate is secured to the body 84 by one or more bolts 87, and preferably a compressible washer or sealing disc 88 is fastened between them. At the periphery of the piston, the head 85 and the disc 86 have clamped between them a flexible double ring seal 90, preferably made of some inert and wear-resistant material. In one embodiment of a commercial construction according to the invention, the lip seal rings 90 are formed of polytetra-fluroethylene, known commercially as Teflon. The piston thus mounted within the cavity on the opposite side of the web 63 forms a further variable volume control chamber 95, and in this chamber a spring 96 acts between the disc 86 and the web 63 urging the valve member 80 to a closed position, but with a rather slight pressure which can be overcome by fluid under pressure within the main valve chamber 20 acting on the face of the piston 85 exposed to such chamber.

A guide rod 100 has an enlarged shank portion 102 suitably fastened to the valve member body 84. This rod extends through the stationary guide sleeve 70. At one end the rod is fluted, as indicated at 103, and at the other end adjacent the inlet the rod is of generally circular cross-section and is guided in finger portions 104. Thus the space between the internal walls of sleeve 70 and the rod 100 serves as an inlet duct for fluid under pressure from the inlet, which can enter the control chamber 95. A bypass control duct 105 is formed in the operator housing 15, communicating with chamber 95, and this controlled duct is likewise adapted for connection to a pilot valve.

Fittings for the pilot valve control ducts, which form part of the servo control system, are shown in FIGS. 1 and 2. Fitting 110, parts of which are shown in section in FIG. 1, is connected to the duct 105, while fitting 112 is connected to the duct 75 and control chamber 60.

Referring to FIGS. 5, 6 and 7, the valve and associated servo control are shown somewhat schematically, and, for example, the fittings are not shown in detail, nor are there any details shown of the internal structure of the valve. The duct 75 is connected to a servo control tube 115, which in effect forms a continuation of the duct, and the tube 15 extends to a float-operated servo valve 120, preferably of the toggle type, which controls the passage of fluid from the servo duct. Details of the toggle type of pilot valve linkage will presently be described. Such linkage for pilot valve construction is also shown, for example, in U.S. Patent No. 2,843,145. The pilot valve 120 is controlled by a float 122 mounted in a housing schematically shown at 123, which in turn has one or more openings to the interior of the tank (not shown) into which the fluid is passing from the outlet 29. In a typical arrangement the housing 123 is mounted internally of the tank. Similarly the duct 105 is connected through tube 125 to pilot valve 130 of the same construction, and this pilot valve is controlled by a float 132 supported in a housing 133, which also is arranged to communicate with the interior of the tank, and at the same level as the housing 123. This arrangement provides the dual reliability in that one of either of the pilot valves 120 or 130, when the level of the tank raises with all the floats, will result in shutting off the flow through the main valve outlet 29.

In the particular configuration shown there is also a branch pipe or duct 135 which extends between pipe 115 and a defueling control pilot valve 140. This valve is controlled by float 142, and the float in turn is supported within a housing 143 which is mounted, as shown in FIG. 1, near the bottom of the defueling pipe 30, adjacent the check valve 35.

As shown in FIG. 1, the float 142 is fastened to one arm of a crank 144 which is mounted to pivot on a pin 145. The pilot valve 140 has a pivot connection through a pin 146 with the arm of the crank 144. When the float is in its lower position, as shown in full lines, the toggle linkage portion between the pivot valve and its crank is directed such that the pin 146 is movable to one side and valve 140 is open. The pin-like extension 148 on the end of the pilot valves merely serves as a guide within the port 149. When the float raises the pilot valve is moved to a fitted position and the toggle mechanism straightens. This is not necessary, but in any instance is preferable, because of the fitting force obtained by the valve. As previously mentioned, the pilot valves 120, 130, and 140 may be of like construction.

Upstream of the connection by the pipes 115 and 135 there is a check valve 150, arranged to prevent back flow from the pilot valve 120 to the ducts 75 or 135. This check valve comes into action only during a defueling operation with this power valve configuration.

With reference to FIG. 5, and assuming that the tank is empty, connection of a source of fluid under pressure to the inlet will result in opening, due to this pressure on the valve member 40 since its spring will give way to the pressure of the incoming fluid. As soon as the valve chamber 20 and the closed passageway 32 fill with fluid, the pressure against the piston 85 will also open valve member 80, and fluid will flow into the tank through the outlet 29. The diaphragm check valve 35 is, of course, urged closed at this time by its spring.

FIG. 6 shows the approximate position of the parts during the filling operation, with the assumption that sufficient fluid has entered the tank to raise float 142 and close pilot valve 140. However, this has no effect on the operation of the valve at this time. Fluid under pressure enters the control chambers 60 and 95 via the inlet servo ducts previously described, which communicate with the inlet to the other valve chamber. However, no significant pressure is built up within the chambers since the fluid can escape through the bypass servo ducts, because both pilot valves 130 and 120 are open, and because fluid can flow to the pilot valve 120 through the check valve 150 which will open under a relatively slight pressure.

When the level of fluid in the tank rises enough to lift the floats 122 and 132, both pilot valves 130 and 120 will close. Pressure will then build up within the control chambers 60 and 95, and the valve members will be seated upon their respective seats. This action is due to the difference in area of exposure to the fluid pressure. The pressure builds up, for example in chamber 60 against the diaphragm 50, and this pressure will exceed the pressure in chamber 20 since there is flow from this chamber through the outlet 20 into the tank. The result is a closing movement of valve member 40 and as this valve member seats its effected area exposed to fluid under pressure (i.e., approximately the diameter of the inlet) will be less than the exposed area of the diaphragm chamber 60. This, preferably but not necessarily coupled with the force of spring 62, will hold valve member 40 in its seated position.

For essentially the same reasons, as pilot valve 130 closes, pressure will build up in chamber 95 and the piston 85 will carry valve member 80 to its seated position. Either of these valve members can close the incoming flow of fluid. Thus, with the system operating normally as the servo or pilot valves close, pressure will build up in each of the chambers 60 and 95 causing the respective valve members 40 and 80 to seat.

The diaphragm mounted and controlled type of valve has some preferred characteristics. It is essentially insensitive to dirt in the system, since dirt particles will not interfere with the movement of the diaphragm. With proper mounting arrangements it is also substantially non-leaking, since there are fixed seals between the periphery of the diaphragm and its mounting, and the inner portion of the diaphragm where it is attached to the valve member. If for any reason the diaphragm is ruptured, then it will not function properly, and experience has shown that in such a situation the valve usually will not close properly.

Likewise, there are certain advantages and disadvantages to the piston-cylinder type of servo motor. It employs a moving seal, for example the lip seals 90. Such an arrangement is prone to minor leakage, but on the other hand, even a break axially through such lip seal will not prevent this type of servo motor from operating since the clearance between the piston itself and the cylinder is rather small. Small particles of dirt in the system can interfere with the smooth operation of the servo cylinder. It is also possible under widely varying temperature conditions, particularly at low temperatures under which aircraft may be required to operate, that the thermal relationship of the piston and the cylinder will change due to the particular thermal coefficient of expansion of the materials, and this in turn will tend toward a further cause of leakage of this type of servo motor.

However, by employing a combination of these two types it has been found that an improved duel reliability valve will result. The difficulties which tend to make one of the servo motors inoperative are no particular difficulty to the other, and vice versa. For example, the diaphragm servo motor will not be effected by dirt in the system, and it can be relied upon while under such circumstances the piston-servo motor may give some difficulty. If the diaphragm is ruptured, for example due to wear or abrasion, possibly coupled with an unusual high pressure surge in the system, it will no longer function, but the piston-cylinder servo motor is capable of withstanding such surge conditions without much difficulty and continuing to operate subsequently in an effective manner. These are just some of the difficulties of operation to which these two types of servo motors are sensitive or insensitive in a differing manner. The net result, however, is that by employing the particular combination as disclosed herein, the duel reliability of the valve construction is substantially increased, and the chances of a failure of both valve members to seat when needed are substantially reduced with respect to prior art constructions.

In some uses of the valve, for example in major aircraft where it is required to defuel before storing the aircraft below deck, it is necessary to remove fuel from the tanks, and the configuration of the valve member shown in FIGS. 1 through 6 is particularly useful in that regard. It provides for drawing the fuel from the tank out of the same valve member, and eliminates the necessity for a separate defueling connection to the tank.

With the tank full and all pilot valves closed, the pressure differential across the two servo motor mechanisms in the valve will become essentially balanced, or if anything a slight fluid pressure may remain at the control chamber. The springs 62 and 96 hold the respective valve members seated. When a suction pump or the like is attached to the inlet of the valve member for defueling, as shown in FIG. 7, fluid will be withdrawn from chamber 60 and its volume will decrease, and the pressure therein will drop sufficiently below the pressure in valve chamber 20 to open the valve member 40 and permit fuel to flow upward through check valve 35 and the defueling passage 32, as shown by the arrows. As soon as the level in the tank falls below the float chambers, the respective pilot valves 120 and 130 will open. Thus, if the pressure in chamber 95 has also been reduced initially and the valve member 80 initially opened, as the corresponding pilot valve 130 opens, air will enter the servo duct 125, and as the fluid is withdrawn from chamber 95 there will no longer be a sufficient negative fluid pressure therein to cause valve member 80 to remain open, and it will be seated by its spring.

However, the check valve 150 in the servo control duct 115 will seat under like conditions in that line, and since the pilot valve 140 will remain closed, that portion of duct 115 between check valve 150 and chamber 60, will remain full of fluid, and the negative fluid pressure in chamber 60 will continue until the tank is emptied to such a level that low level pilot valve 140 will open.

FIGS. 8, 9 and 10 illustrate another embodiment of the dual reliability valve, which is essentially the same as the embodiment just described, but does not have the defueling arrangement. Accordingly, since in all essential respects the construction is the same, like or similar parts have been indicated by the same reference numerals as in FIG. 1. The chief difference is in the housing, comprising a casing 10a for the inlet and a casing 12a for the outlet, having clamped between them the operator housing 15a and its corresponding flange 16a. The servo ducts 75a and its fitting 112a and the duct 105a (FIG. 10) may be arranged at any convenient position around the periphery of the operator housing and its flange. In this configuration the ducts are shown as extending to opposite sides of the valve. In all other respects the construction and function of the valve are essentially as described in connection with the other embodiment. A valve such as shown in FIGS. 8, 9 and 10 can be employed as an inline control valve in many situations where a duel reliability servo control valve is required. It will be obvious to those skilled in the art that the valve arrangement is not limited to the control of the filling of tanks, nor to float-operated pilot valves of the type disclosed herein. However, the valves as disclosed herein do have particular utility in such environment.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A servo operated valve comprising a body having means forming a main fluid passage including a valve chamber, means forming inlet and outlet ports at opposite side of said valve chamber and in predetermined alignment with each other, a pair of oppositely acting fluid pressure operated inlet and outlet valve members mounted in said chamber, said inlet valve member controlling the flow of fluid through said inlet port and said outlet valve controlling the flow of fluid through said outlet port, separate control chambers associated with respective ones of said valves, a separate control duct leading from each control chamber, a flexible diaphragm separating that one of said control chambers adjacent to said inlet port from said valve chamber and mounting said inlet valve member for movement with respect to its port, said diaphragm having a greater effective area exposed to fluid under pressure than said one valve member, a piston having a peripherial seal and separating the other said control chamber from said valve chamber, said piston mounting said outlet valve member and said piston having a greater effective area exposed to said fluid under pressure than said outlet valve member, and pressure fluid supply ducts respectively and independently of each other connecting each of said control chambers to said inlet port and continually admitting fluid for closing each of said valve members independently of each other when the pressure of fluid in its associated control chamber is greater than the pressure of fluid in said valve chamber.

2. A servo operated valve device comprising a body adapted for mounting on a tank and having means forming a main fluid passage including a valve chamber, means forming inlet and outlet ports at opposite sides of said valve chamber, said outlet port being arranged for connection to the tank, a pair of fluid pressure operated inlet and outlet valve members mounted in said chamber, said inlet valve member controlling the flow of fluid through said inlet port and said outlet valve controlling the flow of fluid through said outlet port, separate servo motors each including a control chamber associated with respective ones of said valves, separate first and second control ducts leading from said control chambers, first and second pilot valves controlling the passage of fluid from said chambers through said control ducts, pressure fluid supply ducts connecting each of said control chambers to said inlet port for closing each of said valve members independently when the pressure of fluid in its associated control chamber is greater than the pressure of fluid in said valve chamber, a branch pipe extending from said valve chamber between said ports and also adapted for connection into said tank, and a valve in said branch pipe constructed to pass fluid only in a direction through said branch pipe into said valve chamber.

3. In a valve device as defined in claim 2, the combination including separate first and second float mechanisms connected to said pilot valves and adapted to close said first and second pilot valves in response to filling of the tank, a third pilot valve and a third float mechanism connected to control flow through said first control duct and in turn connected to said first pilot valve and to the control chamber associated with said inlet valve member, check valve means in said first control duct preventing flow of fluid from said first pilot valve toward its associated said control chamber, and means for mounting said third float mechanism at a level corresponding to the connection of said branch pipe to the tank.

References Cited by the Examiner

UNITED STATES PATENTS

| | | | |
|---|---|---|---|
| 1,501,331 | 7/1924 | Gulick | 137—245 |
| 2,619,108 | 11/1952 | Sweeney | 137—414 |
| 2,774,379 | 12/1956 | Sweeney | 137—414 X |
| 2,811,167 | 10/1957 | Bott | 137—414 |
| 2,851,055 | 9/1958 | Mosher | 137—413 X |

ISADOR WEIL, *Primary Examiner.*

WILLIAM F. O'DEA, MARTIN P. SCHWADRON,
*Examiners.*